Patented Dec. 14, 1948

2,456,326

UNITED STATES PATENT OFFICE 2,456,326

PREPARATION OF SUPPORTED ALUMINUM CHLORIDE CATALYSTS

Walter H. Rupp, Mountainside, and Clarke T. Harding, Hillside, N. J., assignors to Standard Oil Development Company, a corporation of Delaware No Drawing. Original application August 17, 1943, Serial No. 498,974. Divided and this application May 20, 1944, Serial No. 536,642

4 Claims. (Cl. 252—250)

This application is a division of Serial No. 498,974, filed August 17, 1943 (now abandoned).

The present invention relates to a new and improved combination type catalyst, comprising, essentially, an anhydrous aluminum halide impregnated in a sorptive carrier, and to the novel method of preparing the same.

Aluminum halide catalysts of the type known as Friedel-Crafts catalysts have heretofore been employed as activating agents for various types of organic reactions such as, for example, the alkylation of isoparaffins with olefins, the nuclear alkylation of aromatics with alkyl chlorides, alcohols or olefins, the isomerization of normal paraffins to isoparaffins, and the polymerization of olefins to form normally liquid olefins of higher molecular weight which upon hydrogenation are suitable for use as motor fuel constituents. Great difficulty is experienced in the handling of catalyst masses used in connection with these various types of organic condensation and isomerization reactions because of the tendency of the aluminum chloride to become hydrolized upon contacting moisture. The catalyst masses enjoy their highest efficiency when the entire system is kept under substantially anhydrous conditions. This is a relatively difficult matter because of the fact that not only must the aluminum chloride or aluminum bromide be maintained in anhydrous condition but in the handling of the carriers in which these various aluminum halides are sorbed, atmospheric moisture tends to be sorbed therein so that at least a portion of the aluminum halides, upon being impregnated in such porous carriers, tends to hydrolize, thereby causing a wastage of the aluminum halide. In the past, the sorptive carriers and the various aluminum halides have been shipped in air-tight, moisture-proof containers, but because of the scarcity of materials such expensive containers are not always readily available.

A particularly effective aluminum halide composite catalyst is prepared by impregnating aluminum chloride or aluminum bromide in a sorptive alumina such as, for example, alumina which has been activated or a partially dehydrated bauxite. The precautions heretofore mentioned to maintain the carrier and the catalyst moisture-free apply in the preparations of these particularly effective catalysts. In order to overcome the presence of moisture in the reaction zone, it has therefore been necessary to pretreat the feed stock to remove all traces of water therefrom, to kiln dry the carrier employed in making up the catalyst composition, and to take all necessary precautions to prevent the aluminum chloride or aluminum bromide from taking up water.

It is an object of the present invention to obviate the necessity for resorting to the use of expensive drying equipment for removing water from sorptive carriers which are to be impregnated with aluminum halides. It is a further object of the invention to obviate the necessity for employing expensive moisture-proof containers for the transporting of said carrier materials. It is a further object of the invention to obviate the need for extensive handling and resultant powdering of highly friable carrier materials for catalysts of the heretofore-mentioned type. It is a further object of the invention to minimize the possibility of effecting structural change in these highly porous carrier materials when they are calcined under severe conditions, such as freeing titanium chloride when a partially dehydrated bauxite is contacted with the hydrogen chloride and aluminum chloride in the process. Other objects will be apparent upon a fuller understanding of the invention to be hereinafter described.

The present invention resides in the discovery that it is unnecessary to subject a partially dehydrated bauxite or other sorptive carrier material such as, for example, the sorptive aluminas, to drastic calcining or drying treatment prior to impregnating that carrier with the desired aluminum halide and charging the resultant composite catalyst mass to a reactor. It has now been discovered that the water contained in these various types of sorptive materials may be conveniently removed therefrom even though no special precautions have been taken to prevent the sorption of atmospheric water thereinto if the carrier materials are simply charged to the reactor in which the catalyst is to be employed and a stream of superheated hydrocarbon vapors passed therethrough for a relatively short period of time or until the amount of moisture has been reduced to the desired minimum. Usually the amount of moisture is reduced to something like 3% by weight or less of the porous carrier. The remaining moisture in the carrier has been found to be relatively firmly combined with the carrier material and upon impregnating the carrier with aluminum chloride, for example, no degradation of the aluminum chloride results. Thus, for example, a partially dehydrated bauxite containing more than 3 weight per cent of water, usually 5 to 10% by weight of water, may be charged to a suitable reactor and a stream of dried butane vapors superheated to between about 200° F. and 400° F., preferably between about 250° F. and 350° F., is then passed through the partially dehydrated bauxite for a period of about 1.5 to 3 hours.

A partially dehydrated bauxite so treated was found to have a water content of about 3% by weight or less and did not contain any free or uncombined water that would serve as a free hydrolyzing agent upon impregnating this treated carrier with aluminum chloride. The carrier so treated is maintained at the above-indicated temperatures and vapors of aluminum chloride or of aluminum bromide are then passed through the carrier mass for a sufficient length of time to give the desired concentration of catalyst in the carrier mass. For most of the reactions heretofore mentioned in which such a catalyst may be employed, the total amount of aluminum halide adsorbed on the carrier may range between about 6% and 40% by weight of the carrier. For a catalyst to be employed in the vapor phase isomerization of normal paraffins to isoparaffins, a concentration of free aluminum chloride in a partially dehydrated bauxite ranging from 8% to 12% is adequate at any one time. In case the catalyst is to be employed in the alkylation of isoparaffins with olefins, the amount of aluminum chloride impregnated in the carrier may range as high as 50% by weight although the upper limit as to the amount of aluminum halide impregnated depends oftentimes upon the specific structural nature and porosity of the specific carrier employed.

The impregnation of the aluminum halide vapors into the partially dehydrated carrier mass may be carried out in a number of ways. Thus, for example, solid aluminum chloride as obtained in commerce may be heated to a temperature of about 360° F. and the sublimed vapors passed through the carrier mass. Molten aluminum chloride may have a carrier gas such as nitrogen, carbon dioxide, hydrogen or some similar inert gaseous material, passed therethrough and the resultant admixture of aluminum chloride vapors and carrier gas may then be introduced into the sorptive material so as to impregnate that material with the aluminum chloride vapors.

A particularly economical modification of the present invention resides in the selection of a dry, superheated vapor for dehydrating the catalyst carrier, said vapor being selected with respect to the type of feed stock to be employed in connection with the catalyst mass finally prepared. Thus, for example, dried normal butane superheated to between 200° F. and 400° F. is a particularly desirable medium for use in dehydrating a partially dehydrated bauxite which serves as the carrier material for aluminum chloride. This is by reason of the fact that the normal butane need not be purged from the carrier mass once the partially dehydrated bauxite has become dehydrated to the extent herein indicated; and furthermore, not only does the invention contemplate using the same medium for drying the carrier material as will be used as a feed stock in the reaction employing the final catalyst mass, but the same medium, for example normal butane, at substantially the same temperature as maintained on the carrier material during the dehydrating process or at a temperature slightly lower, may be employed for use in impregnating that carrier material so dehydrated with the requisite amount of aluminum chloride. Thus, for example, if it is desired to prepare an aluminum chloride partially dehydrated bauxite catalyst mass for the isomerization of normal butane, the partially dehydrated bauxite may be dried at a temperature of from 310° F. to 320° F. by passing dried normal butane therethrough at that temperature. The normal butane may then be employed as a carrier medium for vapors of aluminum chloride and this admixture passed through the dried carrier material until from 8% to 12% of aluminum chloride is impregnated in the partially dehydrated bauxite. The catalyst mass may then be employed in the isomerization of normal butane by passing vapors of normal butane at substantially the same temperature as was employed for the impregnation of the catalyst mass and as was employed for the dehydration of the catalyst carrier, together with promotional amounts of a suitable halogen-containing promoter such as, for example, hydrogen chloride, hydrogen bromide, methyl chloride, carbon tetrachloride, chlorine, bromine and the like, through the catalyst mass for the requisite time to effect a substantial isomerization of normal butane to isobutane. By such a procedure it becomes unnecessary to effect a purging operation between each of the steps leading up to the use of the catalyst in an isomerization reaction. Where the catalyst is to be employed in an alkylation reaction, a suitable isoparaffin may serve in place of the normal butane mentioned in connection with the isomerization reaction. It is within the scope of the invention to employ any normal gaseous or vaporized paraffinic hydrocarbon or other type compound not decomposed or reacted on by the carrier or catalyst in substantially anhydrous form as the drying agent for preparing a suitable sorptive carrier material to be impregnated with the aluminum halide desired. Thus, for example, the following are suitable for use in dehydrating sorptive carriers in the manner heretofore described: methane, ethane, propane, butane, isobutane, normal pentane, isopentane, and the similar higher homologues of the paraffin series. Mixtures of two or more of these compounds may likewise be employed; also nitrogen, carbon dioxide, hydrogen and air in superheated and anhydrous form may be employed, although purging operations are ultimately necessary if this class of substances is used.

The dehydration of the carrier and impregnation of the dehydrated carrier mass with aluminum halide may be carried out under superatmospheric or atmospheric pressures but in general atmospheric pressure or the pressure under which the catalyst mass is to be employed is preferred. In dehydrating the sorptive carrier it is at times preferable to maintain a temperature of at least 50° higher on the carrier material than the temperature subsequently maintained on the final catalyst mass when employed for activating the particular reaction. By operating in this manner, the absence of free moisture during the reaction is insured if the feed stock is adequately pretreated to remove all traces of moisture therefrom.

A preferred modification of the present process contemplates the introduction of aluminum chloride vapors into the sorptive aluminas at a temperature below the boiling point and sublimation point of aluminum chloride, yet removing vapors of aluminum chloride from an aluminum chloride drum containing solid aluminum chloride through the expedient of reducing the partial pressure of the aluminum chloride by introducing into the presence of the solid aluminum chloride, hydrocarbon vapors. Such a method permits of the introduction of more accurate and controlled amounts of aluminum chloride into the sorptive alumina carrier.

As a specific example of the manufacture of the catalyst mass in accordance with the process of the present invention, the following is given, although it is not intended that the invention be limited thereto:

*Example 1*

About 110 grams of 4 to 8 mesh partially dehydrated bauxite was charged to a closed reaction vessel. This bauxite had the following composition as received from the supplier:

| | Weight percent |
|---|---|
| $Al_2O_3$ | 77.8 |
| $SiO_2$ | 11.3 |
| $Fe_2O_3$ | 1.8 |
| $TiO_2$ | 3.5 |
| Volatile content | 3.1 |
| Residue | 2.5 |

In storing and handling this material, it picked up atmospheric moisture in an amount ranging between about 5% and 7%, having been exposed to the atmosphere for some period of time. A stream composed predominantly of normal butane was heated to a temperature varying between about 310° F. and 320° F. and passed through the bauxite bed at atmospheric pressure and between about 0.25 and about 1.0 volume of gas per volume of bauxite per hour. At the end of about 1 hour the bauxite was found to have a volatile content of about 3%, which decreased only slightly after passing the vapors through the mass for 10 hours. To this catalyst mass aluminum chloride was charged by passing the dried normal butane vapors, which had been previously treated with aluminum chloride to remove traces of olefins at a temperature of about 70-80° F., through a drum containing solid aluminum chloride at a temperature of between about 270° F. and about 290° F. This admixture was introduced into the bauxite mass until the aluminum chloride was present in about 8% by weight, which gave an active isomerization catalyst.

*Example 2*

The catalyst mass as produced in Example 1 was then maintained at a temperature of about 300° F. and there was passed therethrough a mixture of normal butane containing about 6% of anhydrous hydrogen chloride at a throughput of about 1 v./v./hr. The run was continued for a total of about 450 hours at a reaction temperature of about 300° F. while maintaining a pressure of about 200 pounds per square inch. Aluminum chloride was added intermittently with the feed stock so that in so far as possible a substantially constant conversion was maintained, giving a product containing about 40% isobutane. The catalyst life as measured in gallons of isobutane per pound of aluminum chloride used amounted to about 170 for the optimum operation.

The above conditions as set forth varied somewhat, particularly as to the amount of aluminum chloride introduced at various times during the carrying out of the run, but the overall average closely approximates the figures herein stated.

Having thus fully described the character of the invention, what is desired to be secured by Letters Patent is:

1. A process for the production of a catalyst mass useful in the isomerization of normal paraffins to isoparaffins which consists of dehydrating a bauxite containing more than 3 weight per cent of water by passing anhydrous butane at between about 250° F. and about 350° F., under from about 0 to 100 pounds per square inch gauge pressure, through the bauxite until the water content thereof is between about 1.5% and about 3% by weight, followed by passing anhydrous butane under substantially the same temperature and pressure conditions in contact with aluminum chloride also maintained under substantially the same temperature and pressure conditions and passing the resultant vapor admixture through the said dehydrated bauxite mass whereby the aluminum chloride is impregnated thereinto.

2. A process as in claim 1 wherein the butane employed is normal butane.

3. A process as in claim 1 wherein the butane is replaced by normal pentane.

4. A process as in claim 1 wherein the butane employed is normal butane and the impregnation of the dehydrated bauxite with aluminum chloride-normal butane vapors is continued until the catalyst mass contains between about 6% and about 40% by weight of aluminum chloride based on the bauxite.

WALTER H. RUPP.
CLARKE T. HARDING.

REFERENCES CITED

The following references are of record in the file of this patent:

UNITED STATES PATENTS

| Number | Name | Date |
|---|---|---|
| 2,208,362 | Engel | July 16, 1940 |
| 2,281,924 | de Simo | May 5, 1942 |
| 2,301,615 | Chenicek et al. | Nov. 10, 1942 |
| 2,309,263 | Thomas | Jan. 26, 1943 |
| 2,311,712 | Thomas | Feb. 23, 1943 |
| 2,311,713 | Thomas et al. | Feb. 23, 1943 |
| 2,320,118 | Blaker | May 25, 1943 |
| 2,323,830 | McMillan | July 6, 1943 |
| 2,342,124 | Danforth | Feb. 22, 1944 |
| 2,349,904 | Hachmuth | May 30, 1944 |
| 2,351,577 | Thomas | June 13, 1944 |
| 2,388,932 | Ogorzaly | Nov. 13, 1945 |
| 2,406,477 | Solomon et al. | Aug. 27, 1946 |
| 2,415,061 | de Simo | Jan. 28, 1947 |
| 2,423,845 | Myers | July 15, 1947 |